Aug. 9, 1966 — W. E. SIMAS — 3,265,443
PORTABLE OVERHEAD BIN WITH TRAILER
Original Filed March 30, 1964 — 2 Sheets-Sheet 1
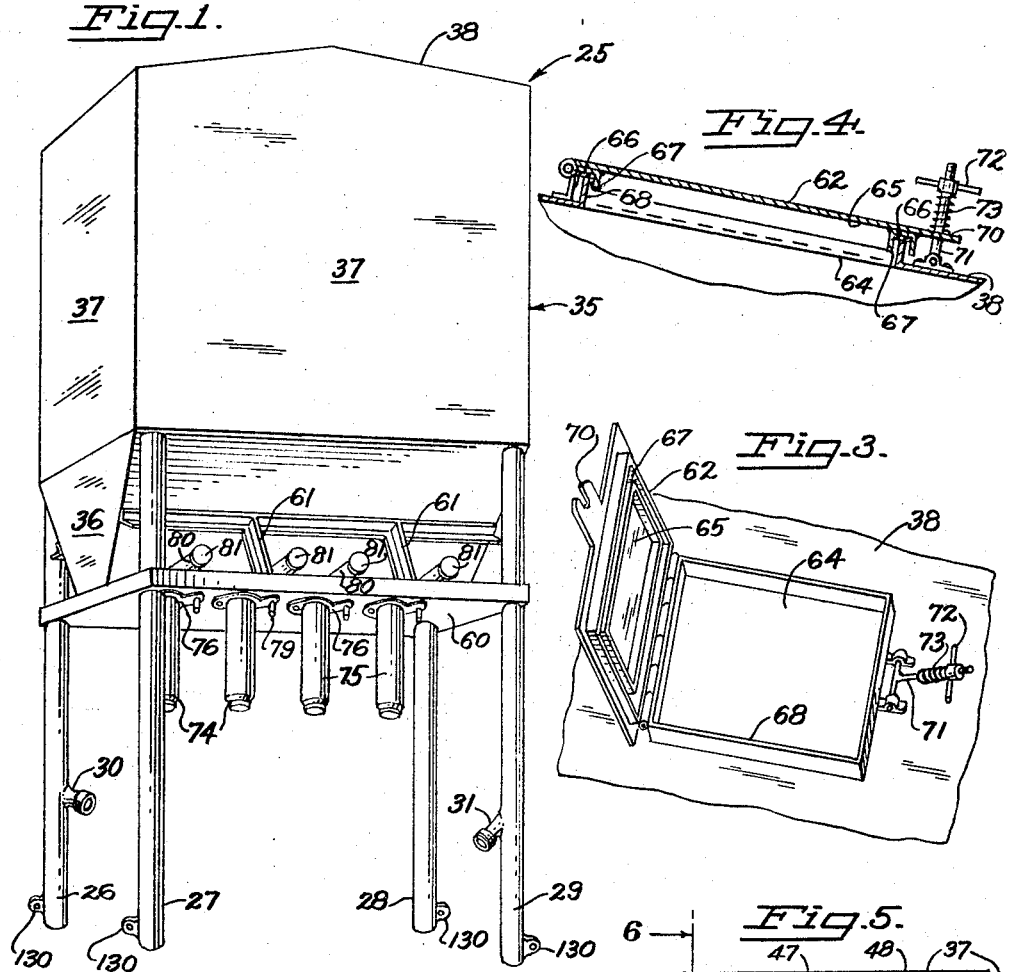
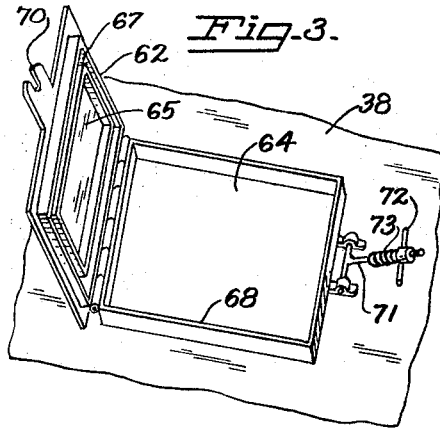
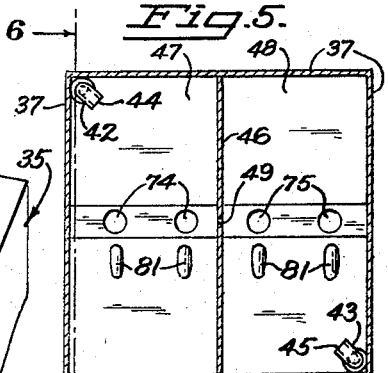
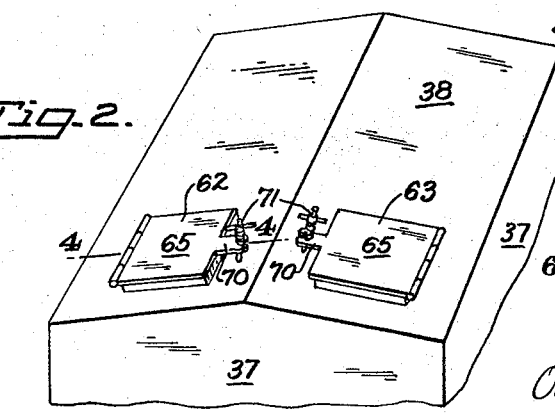
INVENTOR.
WILLIAM E. SIMAS
BY
Owen, Wickersham & Erickson
ATTORNEYS

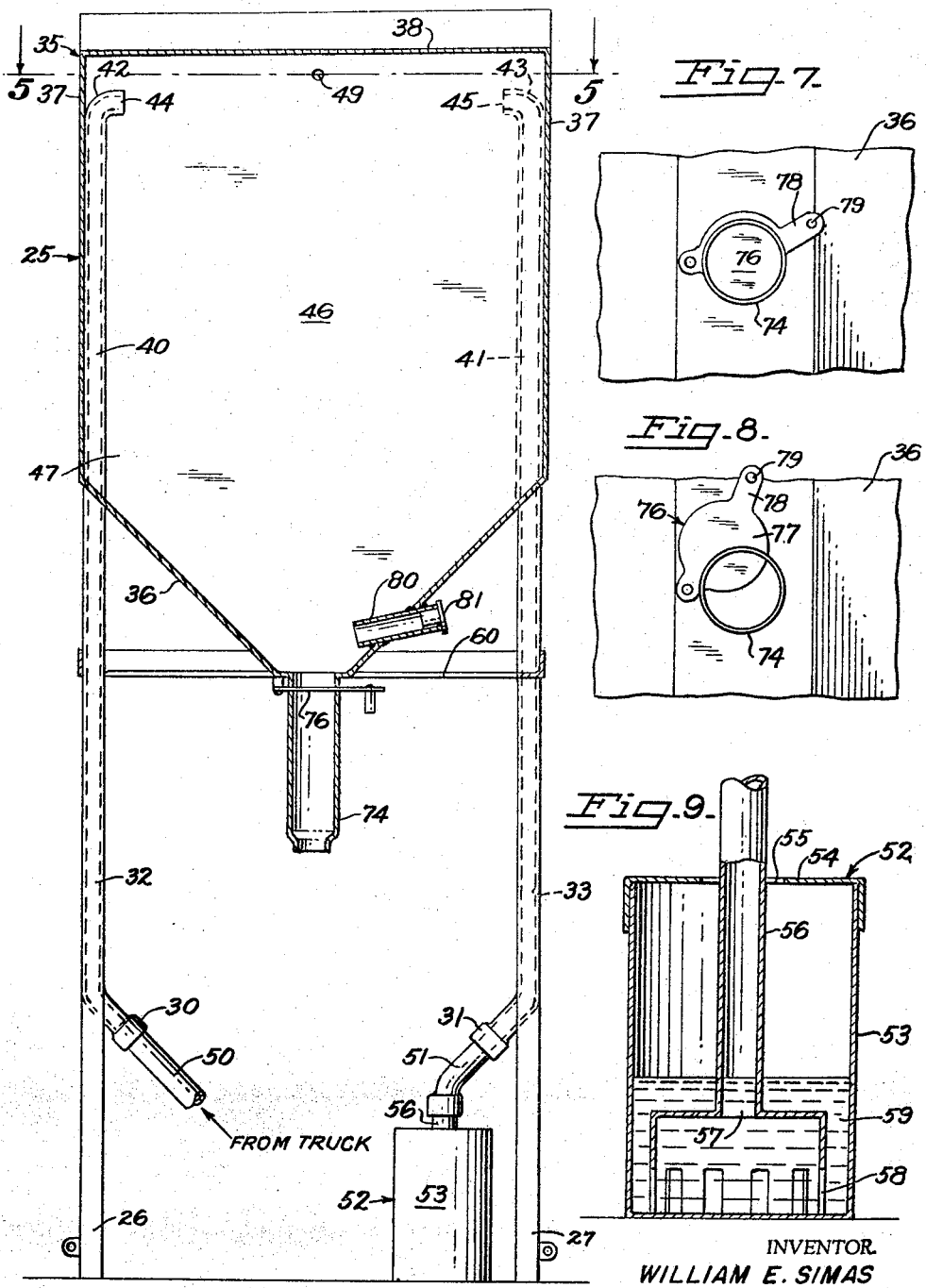

3,265,443
PORTABLE OVERHEAD BIN WITH TRAILER

William E. Simas, Salinas, Calif., assignor to The Triangle Co., Salinas, Calif., a corporation of California
Original application Mar. 30, 1964, Ser. No. 355,738. Divided and this application May 17, 1965, Ser. No. 470,947
10 Claims. (Cl. 302—59)

This application is a division of application Serial No. 355,738, filed March 30, 1964.

This invention relates to a novel portable overhead bin.

When fertilizing a farm, it is desirable to have a large overhead bin close to the area being fertilized. The bin can be refilled by large trucks and can then be used to dispense the fertilizer to fertilizer spreaders, small trucks, and other small vehicles that take the fertilizer directly into the field and put the fertilizer on or into the ground. With such a bin close by, the spreaders and small-capacity trucks do not have to make long and frequent trips to the farm or ranch headquarters, which may be many miles away from the area being fertilized.

However, it is not desirable to spend the capital that would be needed to install a large number of bins and set one up at each desirable location, some of which may not be used for months at a time. The dilemma between having only a few bins with many long hauls of small loads and having many bins lying unused most of the time, is dissolved by the present invention which provides a portable overhead bin. This portable bin can be moved from place to place whenever and wherever desired, can remain at any desired location as long as the nearby parts of the ranch or farm are being fertilized, and then can be moved to another location.

The portable bin of this invention is useful, not only on large ranches, but also on smaller ranches and farms, several of which can get together and maintain one or more such bins, moving them from ranch to ranch or farm to farm so that each farmer has an opportunity to hold his fertilizing costs down. Moreover, the bin can be used for other operations besides fertilizing, whenever it is desirable to have a movable storage bin. Portable liquid storage tanks for liquid fertilizer and other liquids may also be used in the same manner.

In addition, the portable bin of this invention possesses several important advantages. Its structure is rigid enough to endure being moved from place to place over rough roads and through fields; the structure is also simple and free from loose pieces that might interfere with its portability. The invention provides a simple means for filling the bin, and for evacuating air while the filling is going on; it provides for efficient use of the bin outlets and for a simple and effective remedy in case the outlets become plugged. In addition, there are many other significant features which will be discussed below.

Other objects and advantages of the invention will appear from the following description of a preferred embodiment.

In the drawings:

FIG. 1 is a view in perspective of a portable bin embodying the principles of the invention, FIG. 2 is a fragmentary view in perspective of the upper portion of the bin, showing the roof and its novel pressure-relieving hatches, FIG. 3 is an enlarged fragmentary view in perspective of one of the hatches in its wide open position, FIG. 4 is an enlarged view in section taken along the line 4—4 in FIG. 2, FIG. 5 is a horizontal sectional plan view taken along the line 5—5 in FIG. 6, but on a reduced scale, FIG. 6 is a slightly enlarged view in elevation and in section of the bin, taken generally along the line 6—6 of FIG. 5 but with the section line angled in, in part, to show one of the outlet valves and related parts in section. At the bottom right, one filling conduit is shown converted to an air exhaust filter that is used while filling through the other conduit, FIG. 7 is a fragmentary bottom plan view of one of the outlet valves in its closed position, FIG. 8 is a view similar to FIG. 7 with the outlet valve in a partially open position, FIG. 9 is an enlarged view in elevation and in section of the exhaust filter connection of FIG. 6.

A typical bin 25 of this invention has four supporting legs 26, 27, 28 and 29. The diagonally opposite legs 26 and 29 are hollow and are provided with inlet spouts 30 and 31 leading into conduits 32 and 33 respectively. The legs 26, 27, 28 and 29 support an elevated hopper housing 35 with a hopper-shaped lower end 36, side walls 37, and a roof 38. The conduits 32 and 33 extend above the hollow legs 26 and 29 into the hopper housing 35 where they become long tubes 40 and 41 secured to the walls 37, each tube 40 and 41 having a ninety degree elbow 42, 43 at its upper end, terminating in an outlet 44, 45. A vertical partition 46 divides the hopper 35 into two sections 47 and 48, each being filled through its respective conduit 32 and 33, alternately. The outlet spouts 44 and 45, point out horizontally at an angle of about 45 degrees with respect to the hopper side walls as seen in plan (FIG. 5). An opening 49 through the upper end of the partition 46 provides for air passage from one bin compartment 47 and 48 to the other.

During filling, a large truck with a compressed-air supply and a large load of fertilizer is driven up, and the air hose of the truck is attached to one of two flexible conduits 50 and 51 that are removably attached to the ends of the inlet spouts 30 and 31; compressed air is then used to carry the fertilizer into the conduit 50 and through the inlet spout 30, up through the conduit 32 and the tube 40, and out at the top outlet 44, the fertilizer falling down into the compartment 47. The compressed air introduced from the truck's compressor, in order to convey the fertilizer, then flows through the opening 49 into the compartment 48 on the other side of the partition 46, enters the spout outlet 45, passes down the tube 41 and the conduit 33 to the filling inlet 31 and into the flexible conduit 51.

Preferably, the conduit 51 is attached to a dust filter 52, which includes a cylindrical drum or container 53 having an upper end 54 that is closed except for an outlet 55 that is substantially larger than an inlet tube 56 which is attached to the conduit 51. The dust-laden air goes down the inlet tube 56, out its bottom end 57, and through a sparger 58 comprising a cylindrical shell having a series of bottom cutaway portions to serve as outlets. The sparger 58 is immersed in water 59 in the lower end of the drum 53, and the dust is trapped by the water, while the air flows up through the water and out through the outlet passage 55 around the tube 56.

When one compartment 47 of the hopper 35 has been loaded, the flow paths are reversed: the truck's air-conveyed fertilizer is conveyed in through the flexible conduit 51 to fill the compartment 48 and the dust filter 52 is then connected to the flexible conduit 50.

To strengthen it, the bin is provided with suitable supporting struts and braces 60, 61 at the lower end of the hopper 35, connecting the hopper 35 to the legs 26, 27, 28 and 29 and the legs to each other.

The roof 38 of the bin is provided on each side (i.e. above each compartment 47 and 48) with a spring loaded hatch 62, 63, each of which acts as an independent relief valve in case the air pressure builds up too high inside the hopper 35. This applies not only during loading but also as a safety valve if some chemical action should take place in the fertilizer (or other commodity being stored) during the storage period to develop internal pressure. Each hatch 62, 63 comprises a hatch opening 64 and a hatch cover 65. The hatch cover 65 has a rubber gasket 66 in a channel 67 so that it can be closed quite tight against a rim 68 around the opening 64. The cover 65 has a catch 70 which is secured by a pivoted latch 71 having an upper handle 72. A spring 73 is compressed between the catch 70 and the latch handle 72 when the hatch cover 65 is closed. Thus air pressure can push the hatch cover up against the pressure of the spring 73 enough to let the air pass out, while still retaining the solid contents.

Each compartment 47, 48 preferably has two outlet tubes 74 or 75, each of which is normally closed by an individual gate valve 76. To each tube 74 or 75 may be connected, during use, a flexible corrugated conduit (not shown). Each gate valve 76 comprises a pivoted gate plate 77 having a handle portion 78 with a hole 79 which may be engaged with a suitable rod from a truck and opened or closed as desired.

A feature of the invention is an access tube 80 above each gate valve 76. Each access tube 80 is normally closed by a cover 81, and it extends through the walls to a point above and closely adjacent to the upper end of the gate valve 76, in the hopper portion above it. A straight bar or pole can be inserted through the access tube 80 after the cover 81 is removed and can be manipulated to break up material which might be caked and bridging over the outlet 74, thereby freeing the fertilizer material so that it once again flows freely.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A storage bin for comminuted solid materials, including in combination:
 a plurality of supporting legs, two said legs being hollow and being provided with inlet spouts and interior conduits,
 an elevated hopper housing supported by said legs and having a hopper-shaped lower wall, side walls, and a roof,
 conduit means extending from said interior conduits into said housing and up to a level slightly below said roof and having outlet means for horizontal ejection of material therefrom,
 a vertical partition dividing said hopper into two substantially equal sections and having adjacent its upper end an opening for passage of air from one section to the other,
 whereby during compressed-air filling of one section with a comminuted solid, said solid is blown into said one inlet spout and into said conduit means and out the associated said outlet means, and air therefrom passes through said opening to the other said section, in through the said outlet means of that other said section and down its associated said conduit means and out the inlet spout associated therewith.

2. The bin of claim 1 wherein the exhaust air is filtered through water.

3. The bin of claim 1 wherein the roof is provided with a spring loaded hatch above each said section to act as a pressure relief valve.

4. The bin of claim 1 wherein each said section has at least one vertical outlet tube and gate valve means for each said tube, comprising a pivoted gate plate with a handle portion having means for engagement by a long pole.

5. The bin of claim 4 wherein an access tube extends generally horizontally above the gate valve for each said outlet tube, whereby if said comminuted solid material packs and bridges over above said outlet tube, a pole can be inserted to disbridge said material.

6. A storage bin for comminuted solid materials, including in combination
 four supporting legs, two diagonally opposite said legs being hollow and being provided with inlet spouts and interior conduits,
 an elevated hopper housing supported by said legs and having a hopper-shaped lower wall, side walls, and a roof,
 conduit means extending from said interior conduits into said housing and up to a level slightly below said roof and having diagonally facing elbows providing outlets for horizontal ejection of material therefrom,
 a vertical partition dividing said hopper into two substantially equal sections and having at its upper end an opening for passage of air from one section to the other,
 whereby during compressed-air filling of one section with a comminuted solid, said solid is blown into said one inlet spout and into said conduit means and out the associated said outlet and air therefrom passes through said opening to the other said section, in through the said outlet of that other said section and down its associated said conduit means and out the inlet spout associated therewith.

7. The bin of claim 6 wherein the exhaust air is filtered by a cylindrical drum containing water and having an inlet tube extending down into said water with a sparger on its lower end, said drum having upper end closure means with an opening for said inlet tube and for an air outlet passage surrounding said inlet tube.

8. The bin of claim 6 wherein the roof is provided above each said section with a spring loaded hatch to act as an independent relief valve in case air builds up to an excessive pressure level inside said hatch.

9. The bin of claim 6 wherein each said section has at least one vertical outlet tube and gate valve means for each said tube, comprising a pivoted gate plate with a handle portion having means for engagement by a long pole.

10. The bin of claim 9 wherein there is an access tube extending in generally horizontally above each said outlet tube and above the gate valve therefor, and a cover for said tube, whereby if said comminuted solid material packs and bridges over above said outlet tube, said cover can be removed and a pole inserted to disbridge said material.

References Cited by the Examiner

FOREIGN PATENTS 769,232   3/1957   Great Britain.

EVON C. BLUNK, *Primary Examiner.*

A. H. NIELSEN, *Assistant Examiner.*